United States Patent [19]

Salmond et al.

[11] Patent Number: 4,677,613
[45] Date of Patent: Jun. 30, 1987

[54] NETWORK SYSTEM FOR CONNECTING MULTIPLE I/O DEVICES TO COMPUTERS

[75] Inventors: Kent A. Salmond, Los Gatos; Gail P. Cone, Milpitas, both of Calif.

[73] Assignee: The Braegen Corporation, Milpitas, Calif.

[21] Appl. No.: 698,410

[22] Filed: Feb. 5, 1985

[51] Int. Cl.$^4$ ................................................ H04J 3/02
[52] U.S. Cl. ........................................ 370/85; 370/95; 340/825.06
[58] Field of Search ................ 370/85, 95, 86, 89, 370/94 U; 340/825.03, 825.04, 825.06, 825.07, 825.5, 825.51, 825.52

[56] References Cited

U.S. PATENT DOCUMENTS 4,332,027 5/1982 Malcolm et al. ............... 370/94 U
4,337,465 6/1982 Spracklen et al. .................. 370/85
4,445,214 4/1984 Reynolds et al. .................. 370/85
4,451,827 5/1984 Kahn et al. ...................... 370/94 U Primary Examiner—Douglas W. Olms
Assistant Examiner—Wellington Chin
Attorney, Agent, or Firm—Gerald L. Moore

[57] ABSTRACT

A method of allocating transmission time for a plurality of I/O devices (14) connected to a transmission line (12) comprising the steps of causing each device to listen constantly to determine if the line is being used and to only initiate a transmission after waiting a mandatory device delay period (31) and a reply slot period and thereafter to select a random number from 1 to N, with N being the number of bid slots following the mandatory time delay period and the reply slot period, and to begin transmitting only during the bid slot corresponding to the random number selected. Each receiving device is required to answer a transmission during the reply slot period to allow the transmitting device to ascertain that the transmission was received.

13 Claims, 10 Drawing Figures

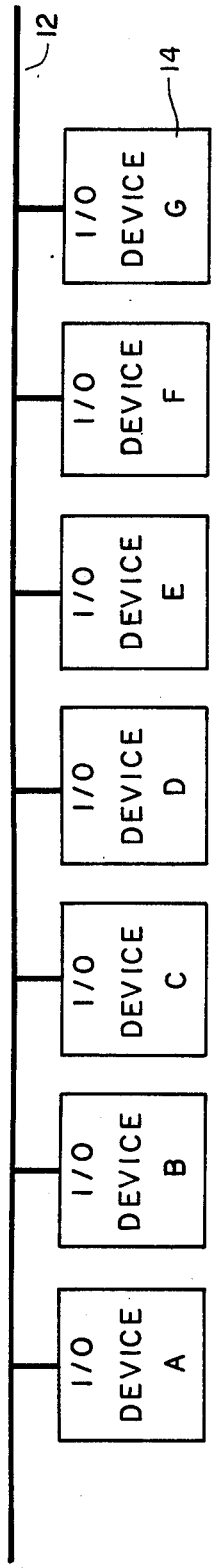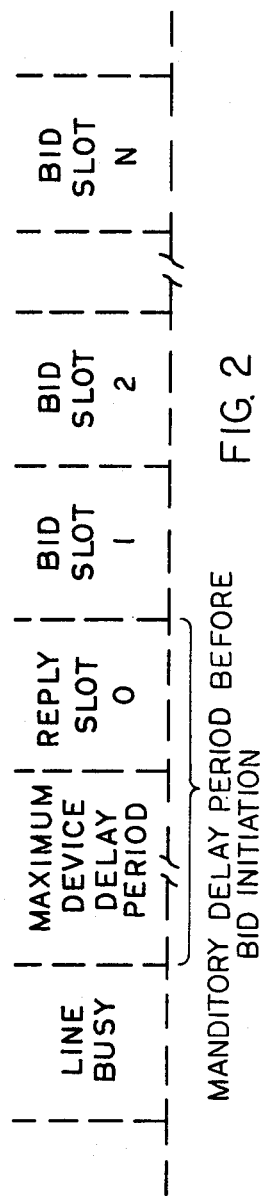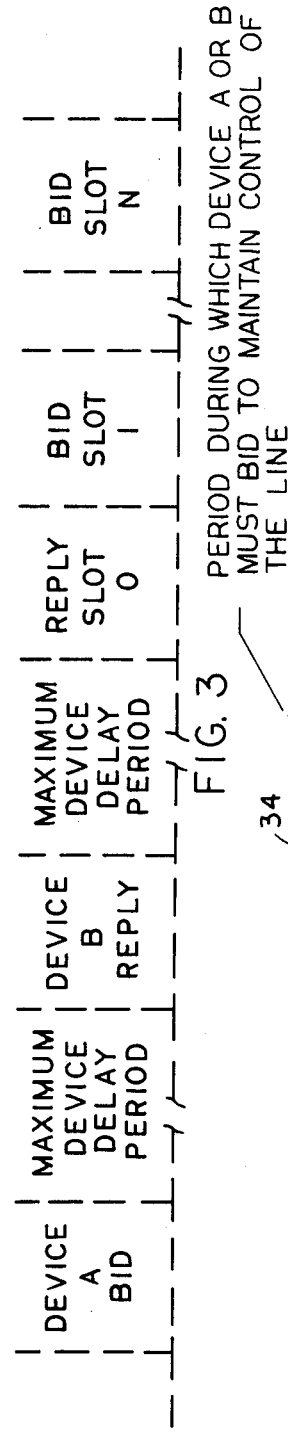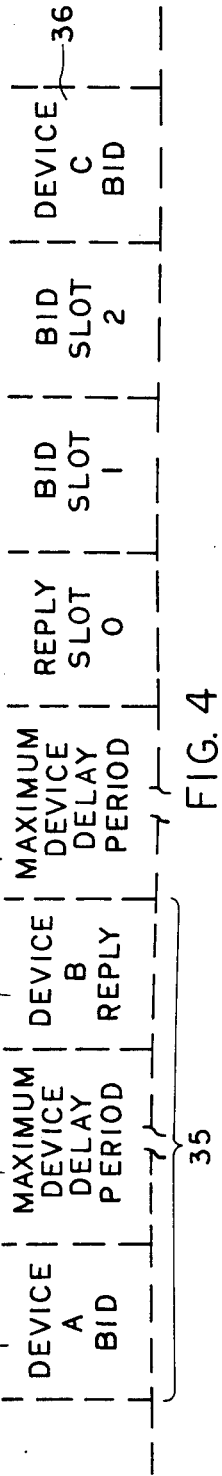
FIG. 1
FIG. 2
FIG. 3
FIG. 4

NETWORK SYSTEM FOR CONNECTING MULTIPLE I/O DEVICES TO COMPUTERS

FIELD OF THE INVENTION

This invention relates to local area networks providing communication between: (1) I/O devices; (2) I/O devices and multiple central processing units; and (3) multiple central processing units. The communications are on a contention or demand basis.

BACKGROUND OF THE INVENTION

Local area network systems have been devised and are now in use to allow such communication described above. Inherent in these systems are obstacles addressed and overcome in this present invention.

Maximum cable length between repeaters.

This problem results in part because of losses incurred in the coaxial cable or other transmission media. However, the protocol used to implement collision detection and avoidance is also a contributor. If, as in one leading network, signal collision is detected by a voltage shift, cable lengths must be limited, higher quality cable required, and repeating amplifiers used. This invention allows cable length increases without the use of repeaters or higher quality cable.

Use of installed cable.

Hundreds of millions of feet of coaxial cable are already installed for existing systems at a cost of between $3 and $10 a foot. Capitalizing on existing cable can reduce costs significantly as well as reduce system installation time. Protocols that require cable replacement are unattractive at best. This invention can utilize installed cable.

Communication efficiency.

All the time spent in signal collision, detection and avoidance detracts from the overall efficiency of the system, This invention reduces collision processing dramatically. Data compaction as implemented in this invention also contributes to efficiency improvement.

This invention provides a protocol not requiring an electrical collision detection scheme, thus reducing stringent Cable requirements. Additionally, collision probability is reduced by a time slot technique. This protocol permits less expensive cable, longer cable distances, and greatly minimizes time spent dealing with signal collision.

SUMMARY OF THE INVENTION

This local area network protocol connects a plurality of devices and central processing units. Its communication scheme fundamentally reduces the probability of collisions occurring. High quality cable and signal repeaters are eliminated and cable distances are increased. The following rules govern the transmission protocol:

1. All transmissions contain a 'to' address and a 'from' address.
2. All transmissions contain a mechanism for insuring proper sequence.
3. All transmissions contain a checking mechanism to insure data content.
4. All transmissions are retransmitted unless a reply is received.
5. All users attached to the cable monitor all messages, accepting those messsages containing its proper 'to' address.
6. No user will transmit while a signal is detected on the cable.
7. The following sequence controls when a user may transmit:
   A. When a transmission completion is detected, a mandatory time delay timer is started.
   B. At the timing out of the timer, a reply should be sent by the receiver of the previous bid.
   C. All waiting devices select a random integer between 1 and N with N being the maximum number of timing slots.
   D. A slot timer and slot counter are started by each waiting device when the mandatory time delay timer times out. The slot timer equals 2 times the maximum propagation time for the transmission line.
   E. At the completion of each slot time the slot counter is reduced by 1. If the slot count reaches 0 and no transmission has already started, the waiting device will transmit.
   F. If the slot counter does not equal zero, the random number is decremented by one.
   G. If a signal is detected on the cable during steps D or E above, the above procedure is repeated from step A with the decremented random number.

The approximate probability of collision is computed as follows:

$$P = \frac{A^2 - A/2}{(1 - A)^2 S^2}$$

Where:
A = Local Area Network Utilization Factor
S = Maximum number of slots.
P = Proability of colliding using the subject Algorithm.

DESCRIPTION OF THE DRAWINGS

FIG. 1 is a schematic of a data processing system in which the subject invention can be utilized;

FIG. 2 shows a typical signal sequence of the subject invention;

FIG. 3 shows a signal sequence of two devices communicating;

FIG. 4 shows a signal sequence of two devices communicating and a third device awaiting access to the cable;

DESCRIPTION OF THE INVENTION

Figure 5:
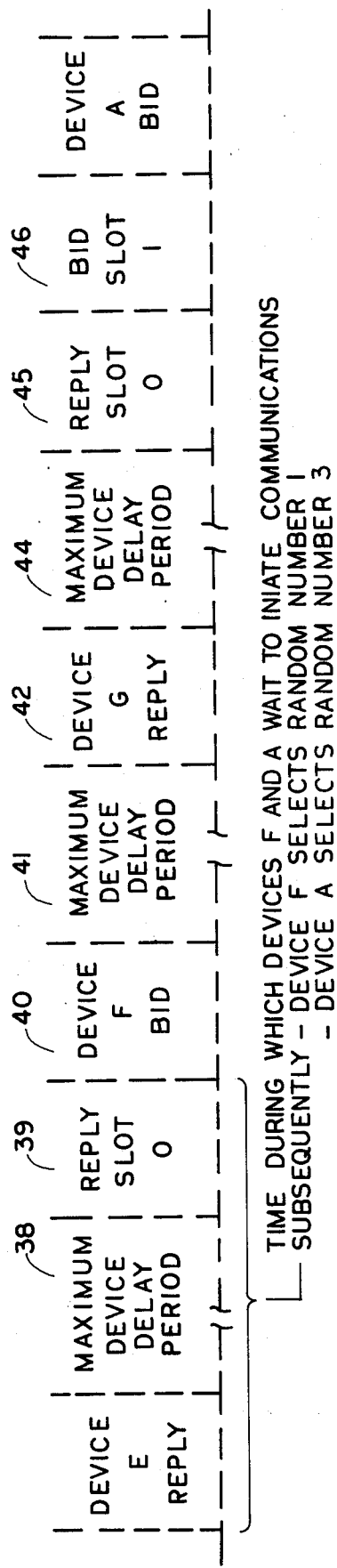
FIG. 5 shows two devices awaiting access to the cable while a third device is communicating.

The overall purpose for the subject invention to allow the exchange of data by communication between one or more devices, illustrated in FIG. 1 as being a plurality of input/output devices (I/O devices) A through G. While the I/O devices are shown in finite number, in actuality the subject invention can permit communications between any number up to a total of 252 devices, and with longer address fields, more stations can be attached. For this purpose, a coaxial cable 12 connects the I/O devices.

As a background for the invention, it must be realized the overall purpose is to allow each device connected to the coaxial line to communicate at a time as near as possible to that desired and with no interference from the other devices. As the activity of devices grows, this result becomes more and more difficult to attain. The greater the activity of devices connected, the greater the likelihood therefore-of collisions between messages transmitted. Such collisions will render all interfering communications illegible to any device. Naturally, it is advantageous to any system to prevent collisions to the degree possible, because when that occurs no usable data is transmitted. As a second step, it is important to detect when collisions have occurred so the sending device can retransmit (retry) as soon as the line is available so as to complete the communication desired.

In accordance with the primary feature of the invention a collision avoidance scheme involves the incorporation of mandatory time delays between the last transmission and a new transmission. The overall purpose for such a time delay is to allow the completion of a bid and reply sequence without interruption. Additionally, provisions are made to prevent collisions which would normally occur immediately after a bid/reply sequence as all waiting devices start to transmit. For this purpose and as shown in FIG. 2, each device is constantly monitoring the line to determine whether or not the line is busy. When line access is required, a device will ascertain whether or not the line is busy, and if busy, the device will wait until the line is not busy plus a mandatory time period. The mandatory time period is determined as being the maximum device turnaround or response time allowed for the slowest device in the system plus twice the longest line turnaround time. This line turnaround time for the reply is termed Reply slot O. This maximum device delay is maintained as a constant throughout the system. The device delay period is set to equal the time it takes for the slowest device to compile and initiate transmission of a reply following the receipt of a message command or request (bid). A slot time is fixed and uniform throughout the system and is determined from the maximum signal propagation time end to end doubled for maximum line length plus circuit delay. After the passage of the mandatory time period, the device desiring to transmit will select from a random number generating means, a random number (integer) between one and N. This number will dictate a bid time slot designation following the mandatory time period and reply slot at which the device will initiate message transmission if no intervening transmission is detected by the device (line busy).

As shown in FIG. 2, the slots are numbered following the mandatory time period and reply slot from 1-N. The mandatory time period plus the reply slot is followed by a series of bid slots 1-N, each of which is uniform in length throughout the system and is determined as above. The reason for the mandatory time period as indicated in FIG. 2 is to allow the slowest device to receive and respond to a message and to allow the message to be tansmitted along the line. The answering device will initiate the reply transmission as soon as possible during the maximum device delay period. Thus this period is shown as being of a variable length up to the maximum time period. With the device then selecting a random number from 1-N and if a random number 1 is selected, the device will start transmitting at the leading edge of bid slot 1. By starting at the beginning of bid slot 1 sufficient time is allotted for detection of any reply message by a device responding to the previous message (bid). If no reply is detected, the waiting device can use the time of the reply slot to select a random number and prepare to transmit. Thus a device will select a random number and initiate transmitting at the beginning of the slot corresponding to the random number selected. Of course a device is monitoring the line at all times and if a time period equal to the mandatory time delay and reply slot thus the N slots has passed since the last message, logic will allow a device to immediately being transmitting. Experience has shown that with a normal usage of the line a device, in a majority of times, will find the line unused and can initiate transmission immediately.

Thus it can be seen that not only is provision made for all devices to complete a bid and reply sequence but also provision is made to limit the occurrence of a collision following a bid/reply sequence. A bid/reply sequence is shown in FIG. 3 followed by a mandatory time period and the usual slots 0-N.

In FIG. 4 is illustrated a normal bid/reply sequence wherein the device A during the time period 30 initiates transmission. Following the bid transmission device C initiates the mandatory time period delay 31 and terminates the delay when the reply form B is detected during the time period 32. Thereafter a second mandatory time period 34 for device C follows, in the event that device A desires to respond to the reply of device B. The line protocol also allows either device A or device B to again transmit during the mandatory time period 34 allowing a continuance of A to B protocol without interference from other devices. There is a maximum number of bid initiations which devices A & B can initiate in the subject illustration. The maximum number of bid/reply sequences, as an example, could allow 16 bids to be permitted sequentially. the maximum to be established by system requirements. Thereafter control of the line must be relinquished to allow other devices to interfeed with a bid/reply sequence. Additionally a device is allowed to jam the line after receipt of a message and within the allowable device delay for a maximum time if such is necessary to allow the device more time to respond to a communication. Under these conditions the device would send a continuous transmission of zeros or other signal to extend the turnaround time in which it can respond. Normally such jamming sequence is limited to a predetermined time following which the line will be released if the device has not initiated transmission.

In the example of FIG. 4 devices A and B are in a bid/reply sequence and some time during the period 35, a device C desired to bid. The device C senses the occurrence of the signals, waits through the mandatory delay period and thereafter selects a random number so that a bid can be initiated. In this example, device C selects a random number of 2 and after the passage of slots 0 and 1 device C initiates a bid during the time period 36.

To illustrate the manner in which the present protocol resolves conflict, FIG. 5 illustrates the circumstance of a device E sending a reply to a previous bid (not shown) during which time devices F and A await the proper time to initiate communications. Since devices F and A have sensed that E has replied and the passage of the mandatory delay period 38 with no interceding transmission being initiated by either device E or that device which it was communicating with, devices A and F select random numbers from the pool of numbers 1-N. Device F selects the random number "1" and the device A selects a random number "3". Thus after the reply slot 0 time period 39 passes device F initiates the transmission of a bid within the time frame 40. Now follows the mandatory delay period 41 for devices other than G with device G initiating a reply during the time period 42. With the passage of the mandatory period 44 device A which is still holding the random number "2" awaits the passage of slot 0, period 45 and slot 1 period 46 and initiates the transmission of a bid.

Figure 6:
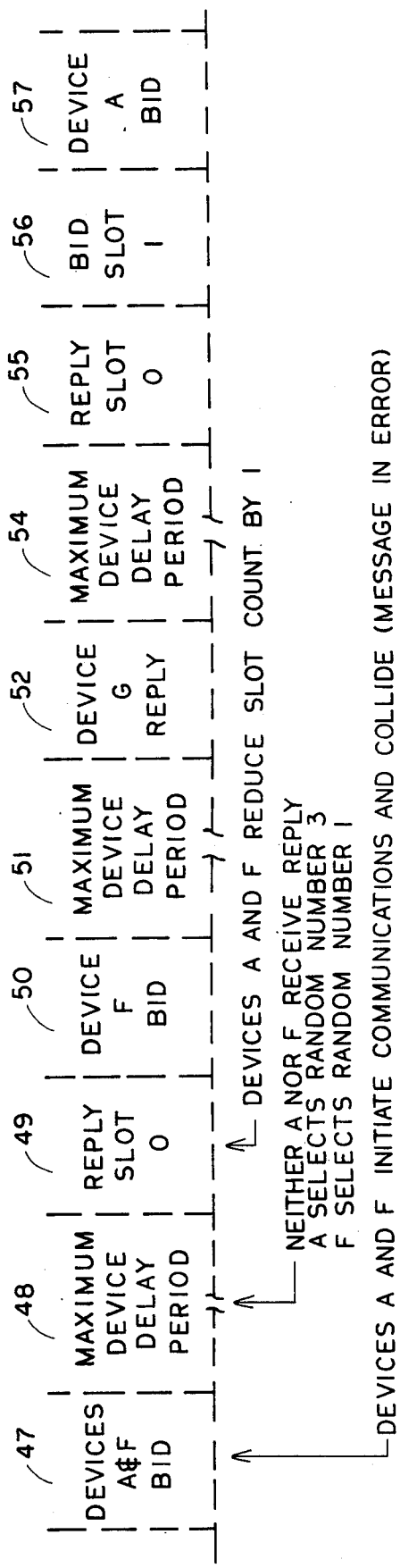
FIG. 6 shows the resolution of a collision between the signals of two devices.

In FIG. 6 is illustrated the message sequence that takes places when messages collide. In this instance during the time frame 47 devices A and F have bid simultaneously. Following the passage of the mandatory delay period 48 both devices realize that they have not received an acknowledgment or reply from their respective addressees. As a result both devices generate a new random number where device A selects the random number "3" and device F selects the random number "1". Thus after the passage of slot 1 during the time frame 49 device F bids. Device F will reduce its slot count by 1 also. Because of the bid of device F, device A delays transmission during the time frame 50 of the bid and the mandatory time frame 51. Thereafter the addressee, device G, replies during the time frame 52. Device A must still await the passage of the mandatory delay 54 and, because of selecting the random number "3" and subsequent slot countdown awaits the passage of the time frame 55 identified as the slots 1 and 2 to thereafter initiate a bid during the time frame 52. To further reduce collision occurrences the device must provide for locking out any transmission when the line is initially busy. That is when the line has gone busy just prior to initiation of a transmit.

Thus it can be seen that very little collision results from the protocol of the subject invention even though the bid/reply sequences are frequent. When a collision does occur realization of that occurrence is immediate and remedial action follows rapidly.

When more than one device are contending for access to the line, simultaneous slot countdown occurs. If the line goes busy the counting stops for all devices looking to access the line. When the line becomes not busy all devices restart the mandatory time out and if not busy start a slot count where it was previously left off. Starting slot counting with a residual count allows devices to increase their priority for line access. If the count reaches 0 and access is not gained, a new random number is selected between 1-N. The procedure for access is then continued using the new number.

Random number selection occurs when access to the line is required. This number establishes the priority for entry to the line. The number can be 1-N where N is established to the formula: N=2 to the power of the integer of [n/2+2] where n=retry attempts, int=integer, and N=maximum range of random numbers to be generated. The actual N (maximum) value is established by the system requirement.

Figure 7:
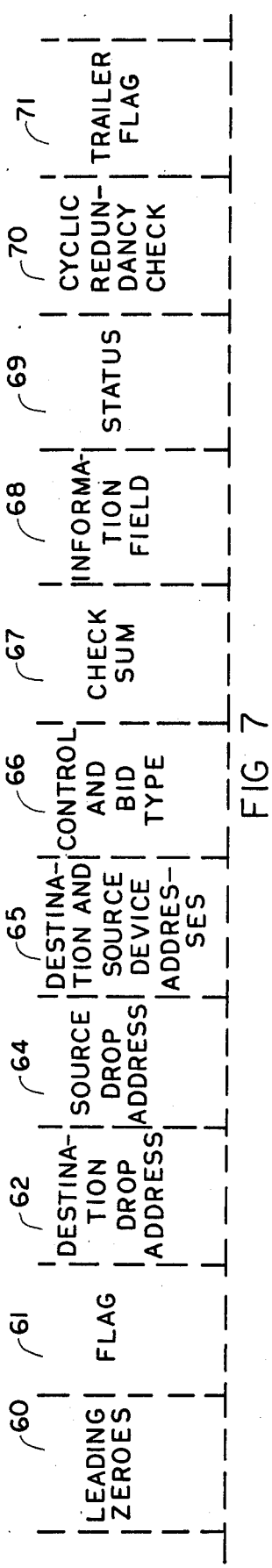
FIG. 7 shows a signal sequence suitable for use in the subject invention.

Shown in FIG. 7 is a message format representative of one type suitable for use in the subject invention. The leading zeros block 60 is to allow synchronization of the receiving device with the signal. The flag 61 identifies the beginning of the serial transmission and consists in this embodiment of eight bits. It also is used to synchronize the data block as a means of locating the byte boundaries. The destination drop at 62 is the address uniquely defining any one of the drops on the coaxial cable except that of the sender. A single drop can control up to sixteen devices in this embodiment and the drop address consists of eight bits. The source drop address 64 consists of one byte that identifies the drop that originated the transmission.

The destination and source device addresses 65 contains the I/O device number at the source drop that initiates a bid and the device number at the destination drop for which the message is intended. The control and bit type 66 describes a drop on a device basis, the type of action required and the types of responses allowable to the bid.

The check sum 67 is the logical sum of the destination address, source address, device address and bid type, and is used by the receiving device or station to confirm that enough correct information had been received to allow the receiving device to stream data to its internal memory. Preferably a test of the check sum results in zero when the above addresses and information are logically summed.

The information field 68 varies depending upon the bid type and the device requirements but may contain data, commands or displacements. The status signal 69 indicates either the control or the device status. The cyclic redundancy check 70 is used at the receiver to test the validity of the transmission just received. The trailor flag 71 indicates the end of the message.

Figure 8:
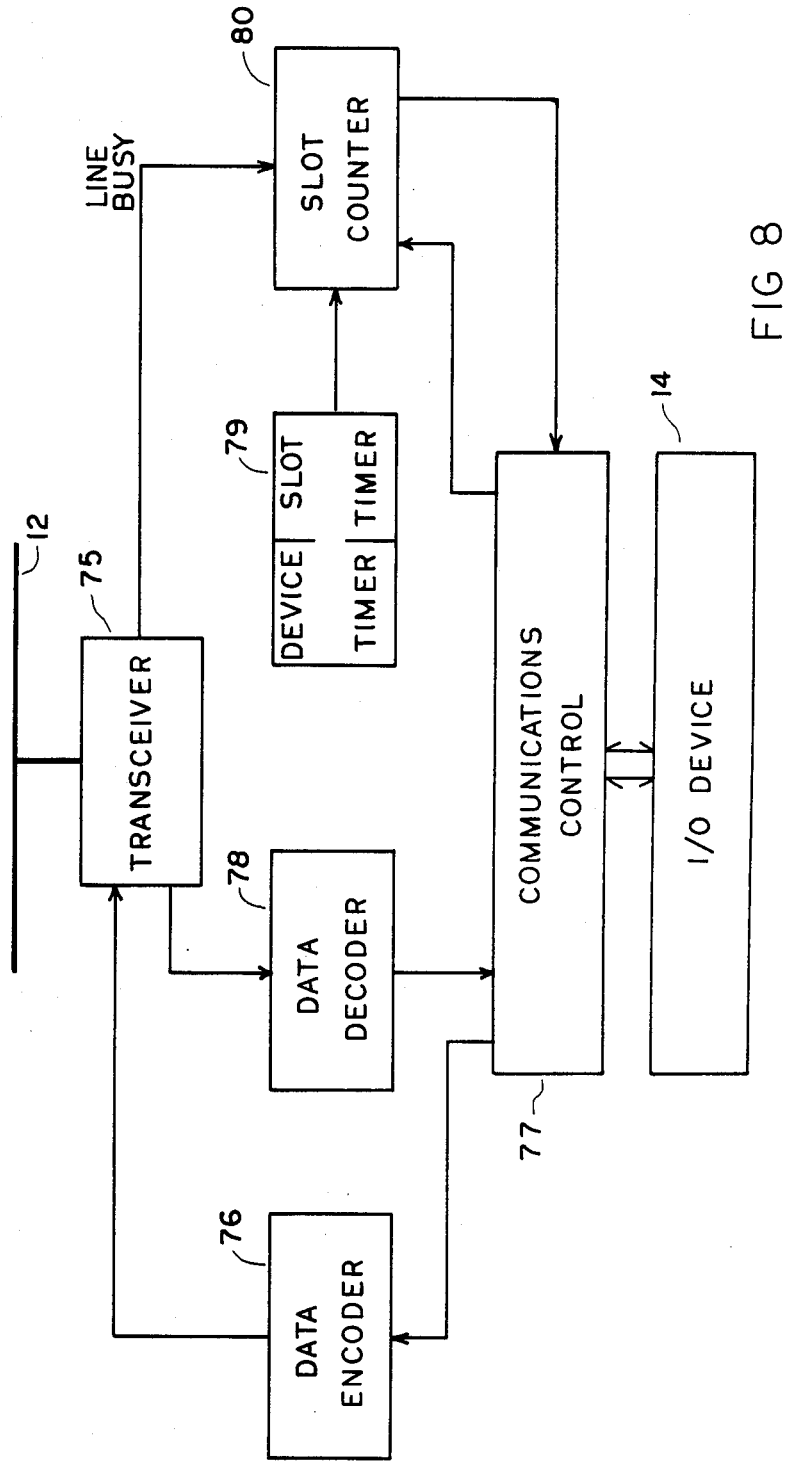
FIG. 8 shows a typical interface between an I/O device and the cable to be used in the subject invention.

In FIG. 8 is shown in block diagram form the interface between a typical I/O device 14 and the coaxial cable 12. A transceiver 75 receives data for transmission through a data encoder 76 from a communication control 77, such data being received from the I/O device 14. Additionally the transceiver receives data from the line 12 and passes such data, commands, etcetera which are received through the data decoder 78 through the communications control to the I/O device. When it is necessary for the device to delay transmission during the device delay transmission during the device delay period and the appropriate reply slots and bid slots a timer 79 passes a time delay signal to a slot counter 80 with receipt of a line busy signal from the transceiver, a random number is generated in the communications control 77. Each I/O device connected to the network system described herein will be supplied with a similar interface for practicing the network protocol described herein.

Figure 9:
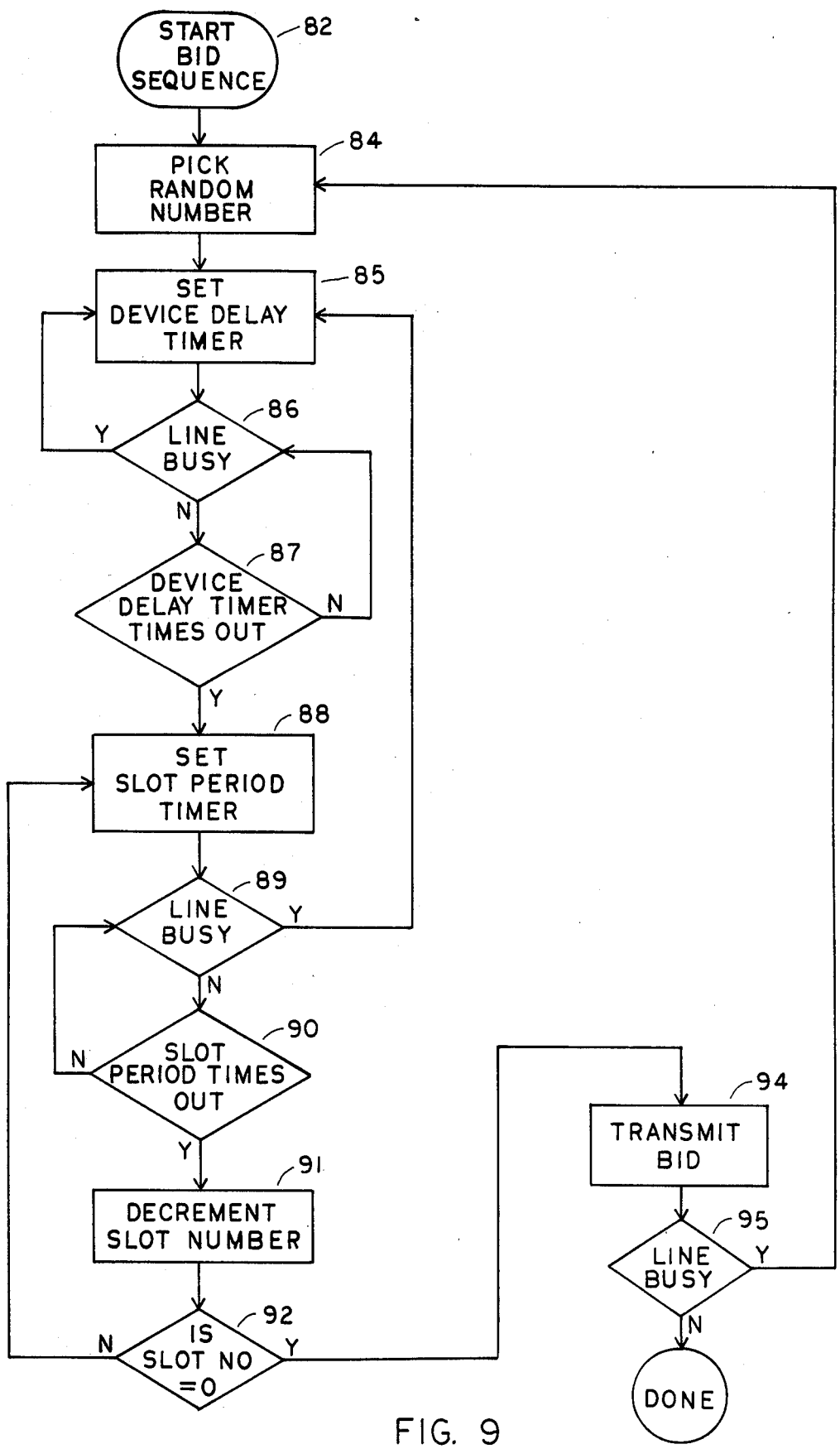
FIG. 9 is a flow chart representation of the Bid algorithm.

In FIG. 9 is shown a flow chart representation of a bid utilizing the algorithm of the subject invention. The bid sequence starts at block 82 if the line is busy a random number is picked at block 84. The device delay timer 85 is set to run and the line is constantly checked by the line busy block 86. If the device delay timer times out and the line is not busy the slot period timer 88 is set and if the line still remains busy at block 89 and the slot timer times out at block 90, the slot number is decremented one number at block 91. When the slot number equals 0 at block 92 the bid is transmitted at block 94. If there is a final lockout before transmission indicated by the line busy block 95, the procedure from selection of a new random number at block 84 is necessary since the random number has now reached 0. A retry procedure is now initiated from block 84. If the line is not busy at block 95, the bid is transmitted. The block 95 represents a mechanical lockout that can occur because another device initiates transmission after the micro-code has approved transmission.

Figure 10:
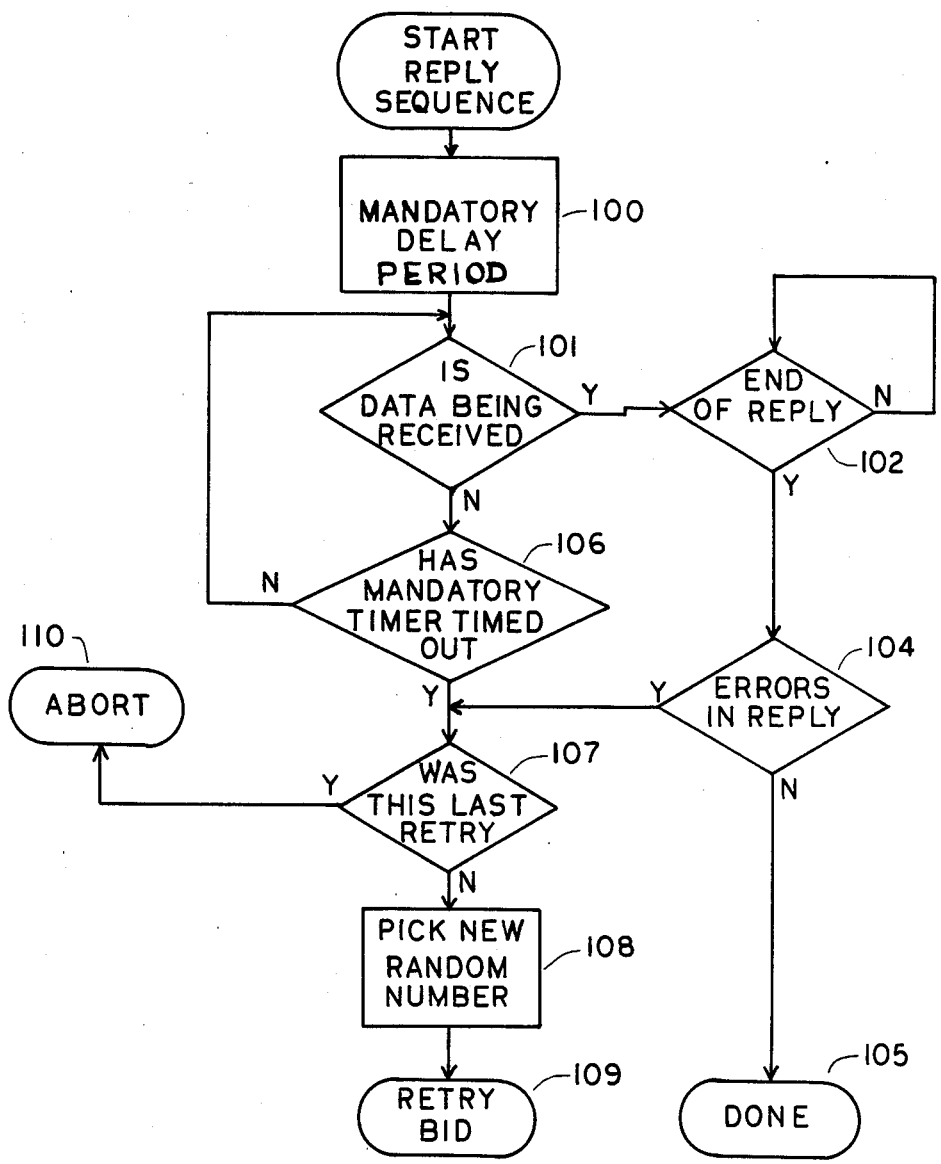
FIG. 10 is a flow chart representation of the Reply algorithm.

In FIG. 10 is the reply sequence flow chart wherein the mandatory delay period runs at block 100 and after that time, if data is being received at block 101 then a delay follows until the end of reply is indicated at block 102. With an error free check accomplished at block 104 the bid/reply sequence is completed at block 105. If data is not received in block 101 indicating the bid/reply sequence is accomplished after the mandatory timer at block 106 has timed out, then a retry is accomplished at block 107 if there is no prohibition against retry. For this purpose a random number is selected at block 108 and a retry bid at block 109 is attempted. If the device has attempted the last retry permitted then an abort at block 110 is mandated.

Thus it can be seen that by the use of the algorithms, collisions are avoided except at those random periods when similar random numbers are selected. Additionally, the communications protocol makes efficient use of the line because with the initiation of a bid sequence, the reply can immediately follow to consummate the communications procedure. If the transmission was not received there is a short delay and the transmitting device immediately reinstitutes bidding to complete the transmission. If the reply device requires greater time it can tie up the line and hold it until the reply can be formulated.

The invention claimed:

1. The method of allocating transmission time to a plurality of devices each having a unique address and being connected to a transmission line for transmitting and receiving messages therebetween, comprising the steps of:
    causing each device to listen constantly for messages addressed to it on said line;
    requiring that each device required to transmit to a second device to determine if another of said devices is transmitting on the line before transmitting and to not initiate transmission if another of said devices is transmitting;
    if no other of said devices is transmitting, allowing said device required to transmit to initiate transmission to said second device after a mandatory time period plus a random selected number of time slots have passed since the last transmission; and
    requiring the second device to initiate a reply message within said mandatory time period following receipt of the transmission and indicating said transmission has been received.

2. The method as defined in claim 1 including the step of:
    requiring all devices required to transmit to repeat the transmission if no reply message is received from said second device within said mandatory time period.

3. The method as defined in claim 2 including the steps of:
    assigning N slot time periods starting after said mandatory time period; and
    requiring each device not recently transmitting or receiving to randomly select an integer between 1 and N after another device has transmitted and to initate transmission only during the slot time period corresponding to said integer selected.

4. The method as defined in claim 3 including the step of:
    selecting said mandatory time period equal to the response time of the slowest device connected to said transmission line.

5. The method as defined in claim 3 including the step of selecting each said slot time period as being equal to twice the maximum propagation time for said transmission line.

6. The method as defined in claim 1 including the step of allowing the second device to initiate transmission of a holding signal to prevent other devices from initiating transmission after said mandatory time period until said second device can formulate a reply.

7. The method as defined in claim 6 including the step of setting a maximum time limit on the duration of said holding signal and if said second device has not initiated the sending of a reply before the maximum time passes, causing said second device to release said transmission line.

8. The method of allocating transmission time to a plurality of devices each having a unique address and being capable of transmitting on the same tansmitting media, comprising the steps of:
    causing each device to transmit only when the transmitting media is clear of any transmission from other devices;
    prohibiting all devices from transmitting during a predetermined time period following any transmission with said time period being selected as the maximum device response time for the slowest device of the plurality of devices plus twice the longest transmission time of the transmitting media;
    requiring all devices to transmit after the last transmission only after a said predetermined time period plus a time delay period equal to a random number of selected time slots of predetermined equal duration; and
    requiring all receiving devices to acknowledge receipt of a transmission transmitted to it within said predetermined time period following receipt of the transmission.

9. The method as defined in claim 8 including the step of requiring all devices to retransmit a transmission until an knowledgment is received from the receiving device.

10. The method as defined in claim 8 including the step of requiring each device to only initiate a retransmission after a random time period if no acknowledgment is received in response to a previous transmission.

11. The method as defined in claim 10 wherein said random time period is a multiple of a preselected time period.

12. The method as defined in claim 11 wherein said preselected time period is determined responsive to the longest response time of any of said plurality of devices.

13. The method of allocating transmission time to a plurality of devices each having a unique address and being capable of transmitting on the sme transmitting media, comprising the steps of:
    causing each device to transmit only when the transmitting media is clear of any transmissions;
    prohibiting all devices from transmitting during a predetermined time period following any transmission;
    requiring all receiving devices to acknowledge receipt of a transmission transmitted to it within said predetermined time period following receipt of the transmission; and
    allowing a receiving device to transmit a holding signal after receiving a transmission and during said predetermined time period to reserve said transmitting media while an acknowledgement is being formulated.

* * * * *